Figure 1:
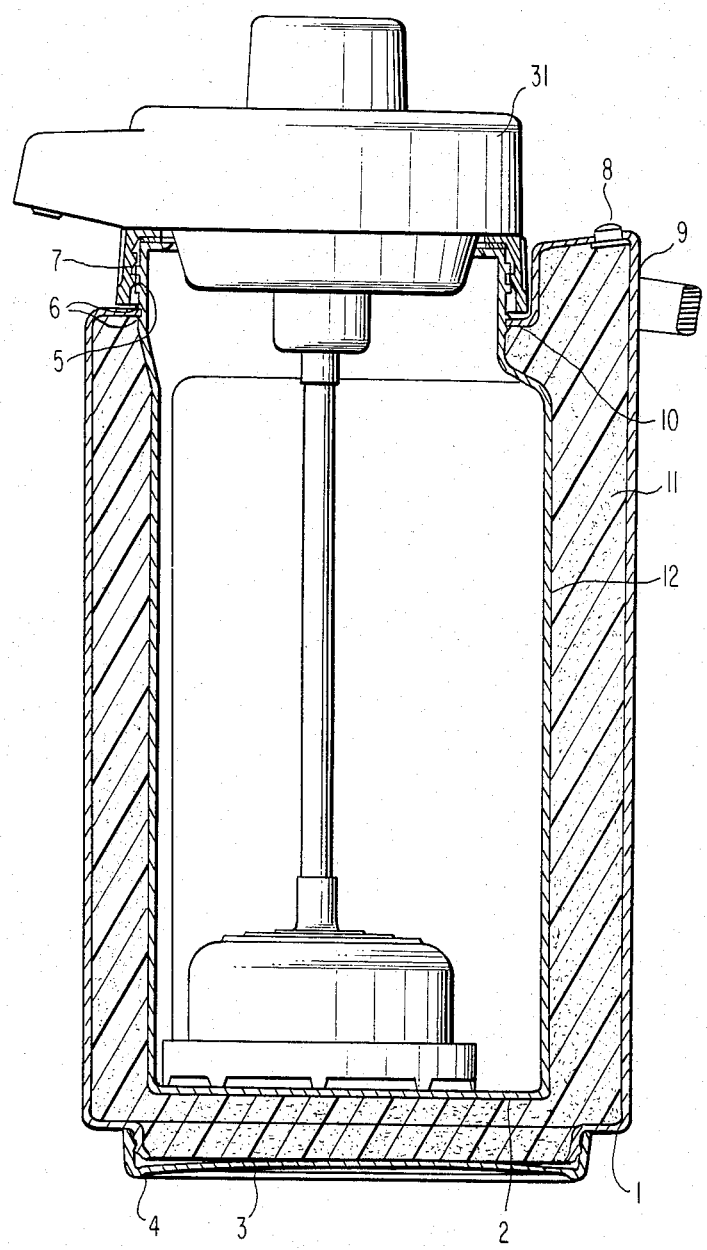

United States Patent [19]

DeFreitas

[11] Patent Number: 4,506,812
[45] Date of Patent: Mar. 26, 1985

[54] WIDE-MOUTHED ISOTHERMAL CONTAINER, EQUIPPED WITH AN IMMERSED PUMP

[75] Inventor: Elias M. DeFreitas, Porto Alegre, Brazil

[73] Assignee: Termolar S/A, Porto Alegre, Brazil

[21] Appl. No.: 342,970

[22] Filed: Jan. 26, 1982

[30] Foreign Application Priority Data

Feb. 27, 1981 [BR] Brazil ................................ 6100280

[51] Int. Cl.³ ............................................ D65D 83/00
[52] U.S. Cl. .................................... 222/536; 222/401; 222/131
[58] Field of Search ............... 222/385, 382, 383, 372, 222/153, 131, 129, 182, 402.11–402.13, 536–538, 533, 544, 556, 209; 220/91, 94 R, 94 A, 96

[56] References Cited

U.S. PATENT DOCUMENTS

| | | | |
|---|---|---|---|
| 1,918,903 | 7/1933 | Fletcher | 222/385 |
| 2,514,147 | 7/1950 | Thomas | 220/91 |
| 2,514,773 | 7/1950 | Kromer | 222/538 |
| 2,880,914 | 4/1959 | Lerner et al. | 222/536 |
| 2,893,612 | 7/1959 | Akers | 222/536 |
| 3,144,177 | 8/1964 | Cookson | 222/385 |
| 3,152,729 | 10/1964 | Piker | 222/533 |
| 3,323,689 | 6/1967 | Elmore | 222/385 |
| 3,905,520 | 9/1975 | Nishioka | 222/209 |
| 4,113,147 | 9/1978 | Frazier et al. | 222/131 |
| 4,116,366 | 9/1978 | Takenakashima et al. | 222/131 |
| 4,174,053 | 11/1979 | Shimizu | 222/209 |
| 4,238,054 | 12/1980 | Chen | 222/131 |
| 4,274,562 | 6/1981 | Medeiros et al. | 222/401 |
| 4,290,537 | 9/1981 | Jung | 222/25 |
| 4,300,705 | 11/1981 | Shy | 222/131 |
| 4,310,104 | 1/1982 | Takatsuki | 222/131 |
| 4,320,856 | 3/1982 | Stewart et al. | 222/131 |
| 4,320,859 | 3/1982 | Shy | 222/536 |
| 4,344,548 | 8/1982 | Fraizer | 222/209 |

Primary Examiner—Joseph J. Rolla
Assistant Examiner—Kenneth Noland
Attorney, Agent, or Firm—Beveridge, DeGrandi & Weilacher

[57] ABSTRACT

An isothermal container having two embodiments; one of them has an assymetric mouth piece, which allows the projection of the pouring spout outwards in the "serve" position and its protection and sealing in the closed position. In the other embodiment, which is cylindrical, the locking and sealing of the spout are made in the coupling ring, where there is a hump located.

6 Claims, 6 Drawing Figures

WIDE-MOUTHED ISOTHERMAL CONTAINER, EQUIPPED WITH AN IMMERSED PUMP

The present invention relates to a new wide-mouthed isothermal container, to which a mechanical device of manual operation is attached, in order to transfer liquids from this container without the need of inclining it, or introducing compressed air into it; this pumping device was the subject of Brazilian Patent No. PI 8100430. The introduced improvements were made in such a way that the container has its pouring spout, sufficiently outward in the "serve" position, so as to facilitate liquid transference.

This is achieved because of the external shape of the container and the eccentricity of the mouth. Moreover, the handle prevents the rotation of the spout of the pump during transportation, thereby avoiding accidentially moving the spout to the "serve" position.

In another model, the container is narrower, provided with a centered mouth, having an added side projection, attached to the coupling ring, to protect the pouring spout and to close the liquid outlet; and additional improvements having been introduced to insure the assembly of the different parts in the correct position.

Figure 2:
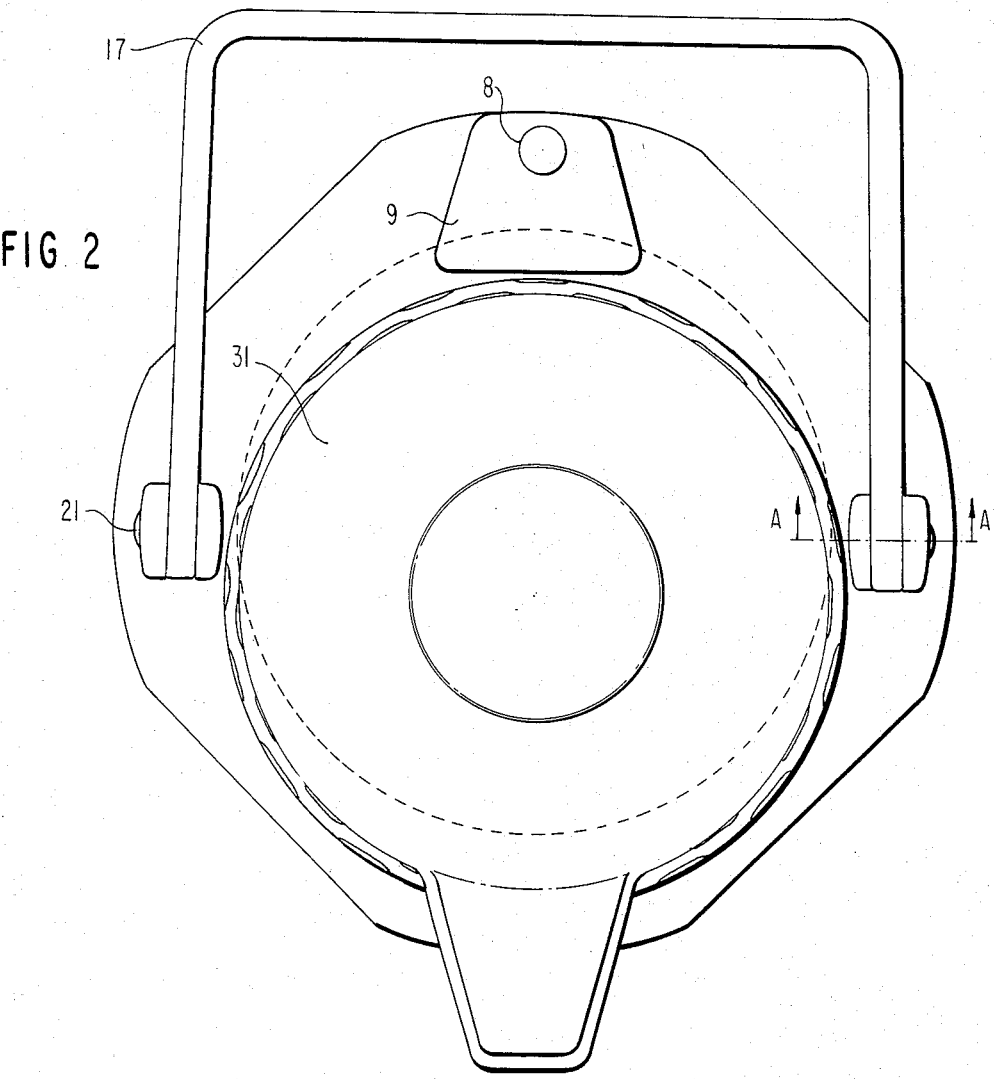
Figure 2A:
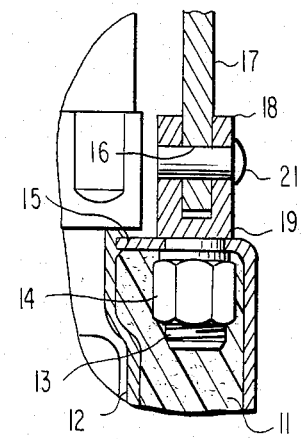
Figure 3:
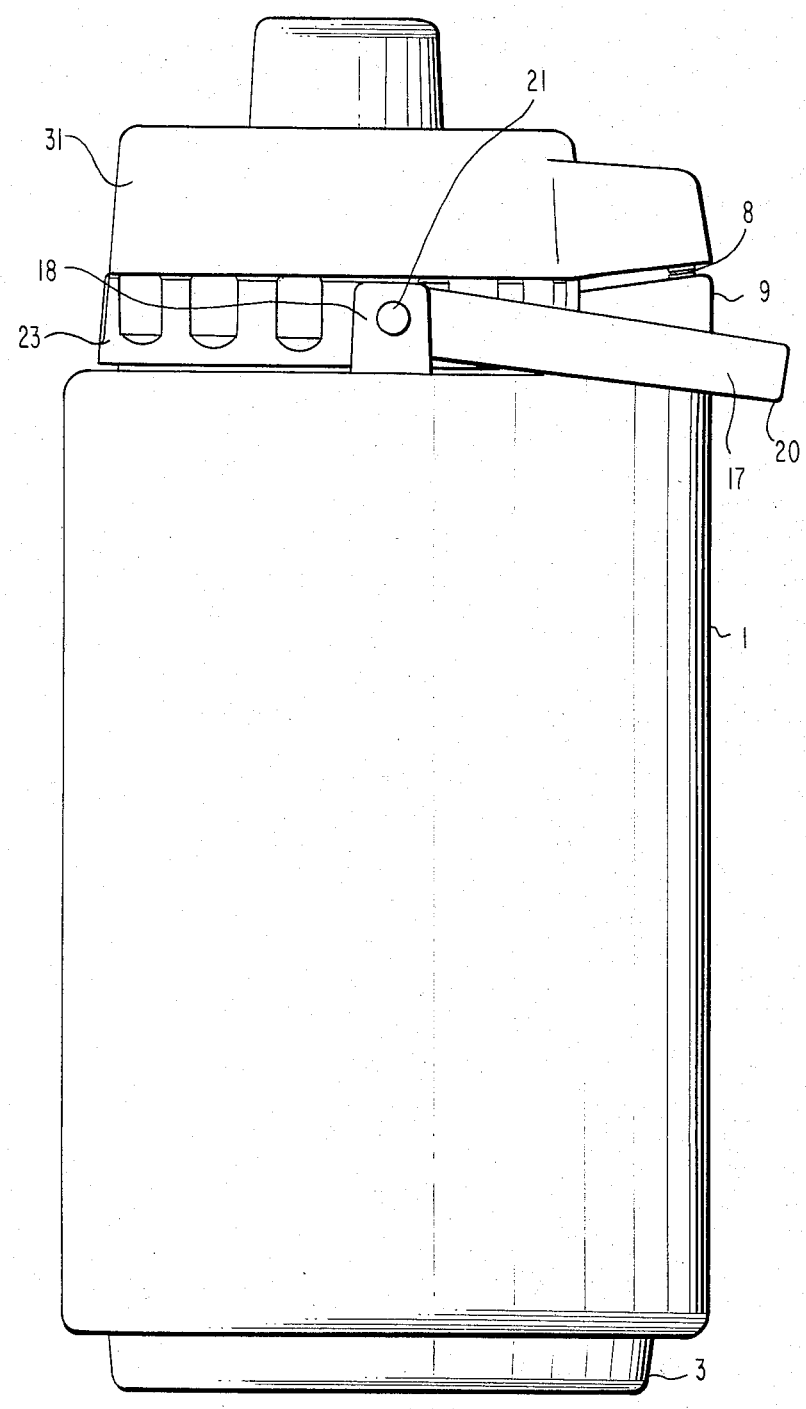
Figure 4:
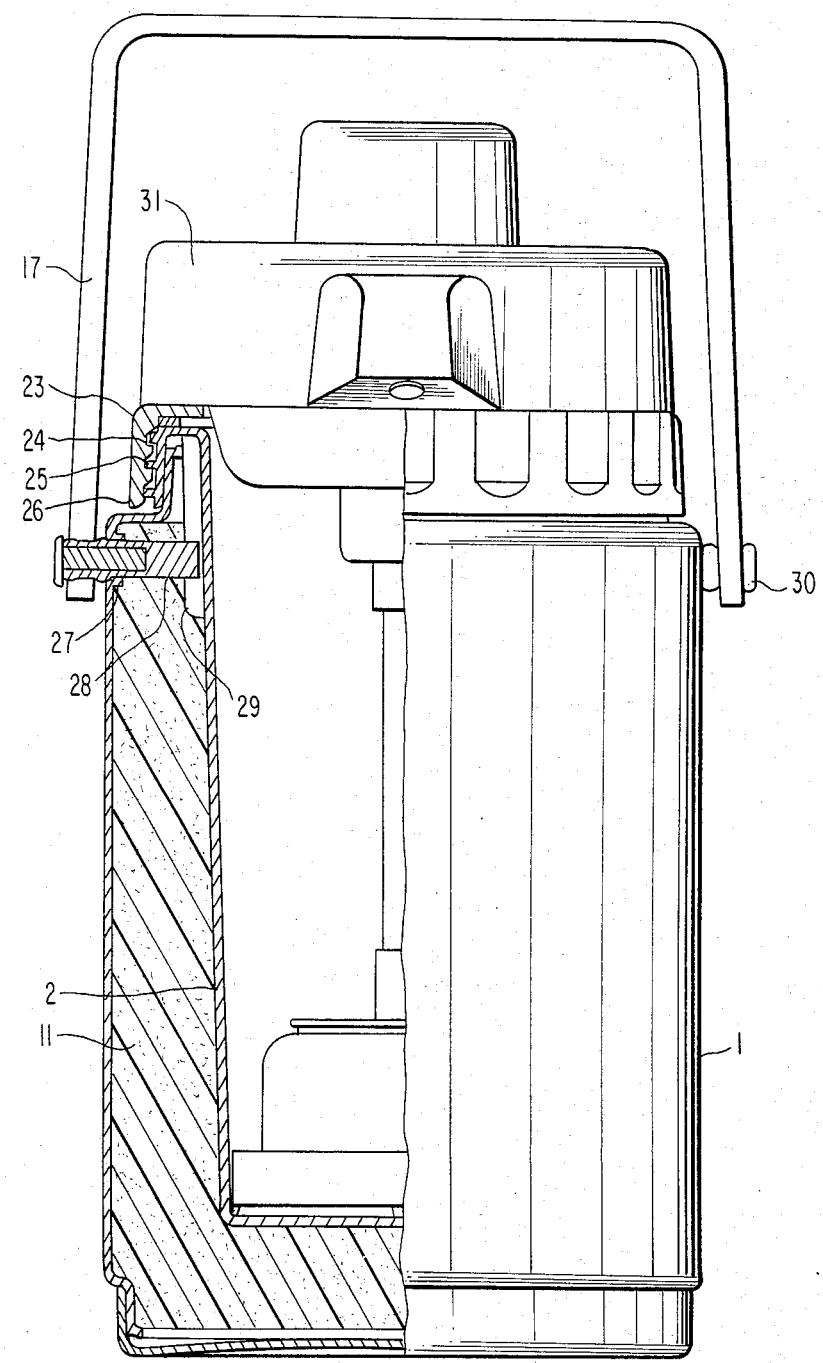
Figure 5:
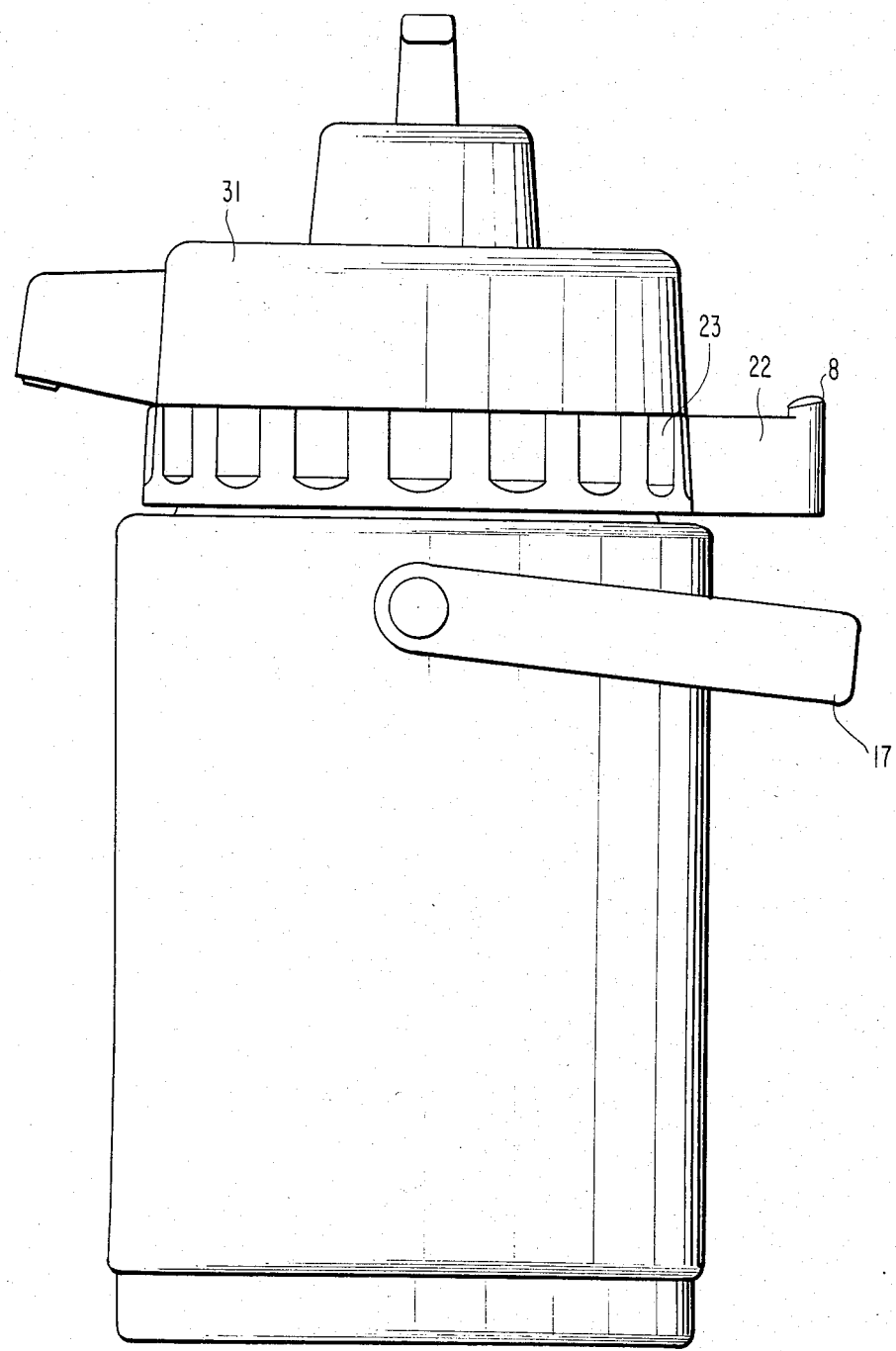

The isothermal container of this invention is insulated with polyurethane from or similar expanded foam material and is described below in its preferred aspects, when considered together with the accompanying drawings, in which:

FIG. 1 is a cross-sectional view;
FIG. 2 is a top view;
FIG. 2A is a section of the handle fixture detail;
FIG. 3 is a side view of the set in the locked position;
FIG. 4 is a partial cross-sectional view of a variation of the container; and
FIG. 5 is a side view of the same variation.

The container itself includes in one embodiment of the invention, an outer case (1) FIG. 1, inner container (2) and bottom (3). The inner container (2) projects itself outwards from the outer case (1).

This projection, or "neck" has an external screw-thread (7), where the serving pump (31) is fitted. This "neck" has two external clamp rims (6), forming a groove which couples perfectly to the upper opening (10) of the outer case (1). The inner container (2) has an eccentric neck (5) in relation to its cylindrical body (12), enabling a pump installed in this container to have its spout projected outwards in relation to the outer case (1), when in the "serve" position, and protected towards the rear of the container when it is closed. The outer case (1) has basically the shape of a right prism with an octoganol base, the sides of which are alternately formed by equal arcs and equal chords of a same circumference, being the intersections of these sides rounded off. This outer case has an opening (10) on its upper part through which passes the neck (5) of the inner container (2). This opening (10) is also eccentrically placed in relation to the geometric center of the upper face of the outer case (1), so as to adapt itself to the eccentricity of the neck (5) of the inner container (2), enabling the area (11) filled with the insulating foam to be fairly constant when the inner container (2) is assembled in the outer case (1), since both have coincident axes. In addition, the outer case (1) has a projection (9) on its back, opposite the opening (10), in relation to the geometric center of its upper face; this projection has a hemispheric hump (8) which has for purpose closing the pump spout outlet thereby preventing insects and impurities from entering when it is turned rearwards for locking.

In its lower part, the outer case (1) has a slightly conical, threaded projection (4), closed by the bottom (3), which in turn is threaded into it, and which gives the finishing to the set. The threaded fixture was adopted due to its better performance when under pressure from the expansion of the insulating material. The container (FIGS. 2 and 3) is also provided with a handle for transportation (17), of rectangular transversal cross-section and with rounded corners (20). This handle (17) has the shape of an inverted "U", having holes (16) on its ends, through which are inserted rotation axles (21). These axles are pressed into the handle rests (18), so as to keep the axles in its housing. The handle holes (16) has a diameter slightly bigger than that of the rotation axles (21), letting the handle (17) tip freely. The handle rest (18) has a base (19) fixed to the outer case (1). This base has a threaded cylindrical prolongation (13) which passes through the holes (15) of the outer case (1).

A nut (14) is screwed to this threaded cylindrical prolongation (13), keeping the handle rest (18) firmly attached to the outer case (1). The isothermal container of the invention can be easily carried about, thanks to its handle (17), which is strongly anchored to the container.

In the vertical position of transportation, the handle prevents the pump spout from turning due to the position of the vertical section of the handle when in the upright position which is in the turning path of the spout, and this, in addition to the fact of the pump spout being coupled to the prominence (8) of the projection (9), helps avoid the accidental unlocking and turning of the spout to the operational position of the pump. After placing the container on a table and putting the handle back down, rotation of the spout to the front position, in which it projects itself outwards, unlocks the pump. A slight pressing on the pump button is then sufficient to serve the desired quantity of the hot or cold liquid stored in the container.

Another embodiment of the same container is the one with a completely cylindrical outer case (1) FIG. 4, and for this reason without the projection (9) FIG. 1 on the rear of the first model. In this embodiment the hemispheric hump (8), for protection and closing of the spout, is part of a projection (22) FIG. 5, in the coupling ring (23) of the pump, since it stays in position while the outer cover and its spout can rotate in relation to the ring. In this variation the internal container (2) FIG. 4 and the outer case (1) have circular concentrical sections; the inner container (2) has in its mouth an outwardly folded rim (24), into which is introduced and fixed with glue or welded the collar (26) of the outer container (1). On the outer wall of the outwardly folded rim (24) there is a screw-thread (25) where the coupling ring (23) of the pump is fixed. In this variation the pivoting handle (17) has the shape of an inverted "U", and is fixed through rotation pins (27), to the side of the outer case (1). The handle (17) cannot loosen itself from the rotation pins (27) because of the rivets (30) fixed to them. As the handle rotating axis must be perpendicularly placed in relation to the direction of serving and closing of the spout, it is necessary to determine the position of the inner container (2) angularly in relation to the outer case (1) during assembly. This is done by means of the inner container vertical walls (29) (two on each side), between which is fitted the prolongation (28) of the handle rotation pins (27).

The empty space between the outer case (1) and the inner container (2) is filled with polyurethane foam (11) or a similar material which, besides its insulating and structural functions, serves to hold in place the rotation pins (27). This construction also allows the insulation to cover the whole area up to the top of the mouth.

It should be understood that the embodiments described herein were intended to serve only as examples of the invention; their shapes, materials and dimensions can be changed without deviating from the basic concept of the invention. This is partly determined by the shape of the thermal container to be used. The device, therefore, must be considered in the general terms of what has been stated above. Further modifications and variations of the present invention which will be apparent to those skilled in the art from the foregoing are intended to be encompassed by the claims appended hereto.

I claim:

1. A wide-mouthed isothermal container equipped with an immersed pump comprising an outer case (1), having a lower slightly conical screw-threaded projection (4) finished by a bottom (3), said outer case having an upper opening (10), an inner container (2) having a neck projection (5) which passes through the opening of said outer case, a projection (9) opposite to said opening (10) and a hump formed on projection (9), said neck projection having external rims (6) forming a groove clamped to the upper opening (10) of the outer case, said neck projection having an external screw-thread (7), said container having a pouring spout (31), there being an empty space (11) between the outer case and inner container, said space being filled with expanded plastic; a pump (31) fitted into the container; a handle (17) attached to the outer case, wherein the neck (5) of the inner container (2), and the opening (10) of the outer case (1), are each disposed eccentric with respect to the symmetrical axis of the container.

2. A wide-mouthed isothermal container equipped with an immersed pump according to claim 1, wherein said handle has rounded edges (20) and is attached to the outer case by attachment through handle rests (18) attached to said outer case, through holes (15), there being screw-threaded projections (13) and screw-nuts (14) associated with said handle and handle rests, which fix the handle rests, said handle rests having handle holes (16) case fitted with a rotation axles (21).

3. A wide-mouthed isothermal container equipped with an immersed pump according to claim 1, wherein the handle (17), when lifted, prevents said pouring spout (31) from rotating, keeping it locked.

4. A wide-mouthed isothermal container equipped with an immersed pump according to claim 1, further comprising a spout which, when turned towards the rear of the container, locks the pump, clamping the spout to the hemispheric hump (8) thereby locking it and preventing impurities from entering the spout, and wherein the spout when turned 180° in relation to the locking position is projected outwards from the container case, thereby unlocking the pump.

5. A wide-mouthed isothermal container equipped with an immersed pump according to claim 1, wherein the handle (17) is attached to handle rests (18), which in turn are fixed to the body of the container by means of attaching means, said handle being mounted on rotation axles (21) whereby said handle articulates itself on the rotation axles.

6. A wide-mouthed isothermal container equipped with an immersed pump comprising an outer case (1), having a lower slighly conical screw-threaded projection (4) finished by a bottom (3), said outer case having an upper opening (10), an inner container (2) having a neck projection (5), said neck projection having external rims (6) forming a groove clamped to the upper opening (10) of the outer case, said neck projection having an external screw-thread (7), said container having a pouring spout (31), there being an empty space (11) between the outer case and inner container, said space being filled with expanded plastic; a pump (31) fitted into the container; a handle (17) attached to the outer case, the outer case (1), having a prismatic shape and being of octagonal transverse cross-section with sides alternately arcs and chords of the same circumference, limited at its top by a flat surface which has a projection (9) diametrically opposed to the opening (10) of the container, said projection having a hemispheric hump (8).

* * * * *